Figure 1:
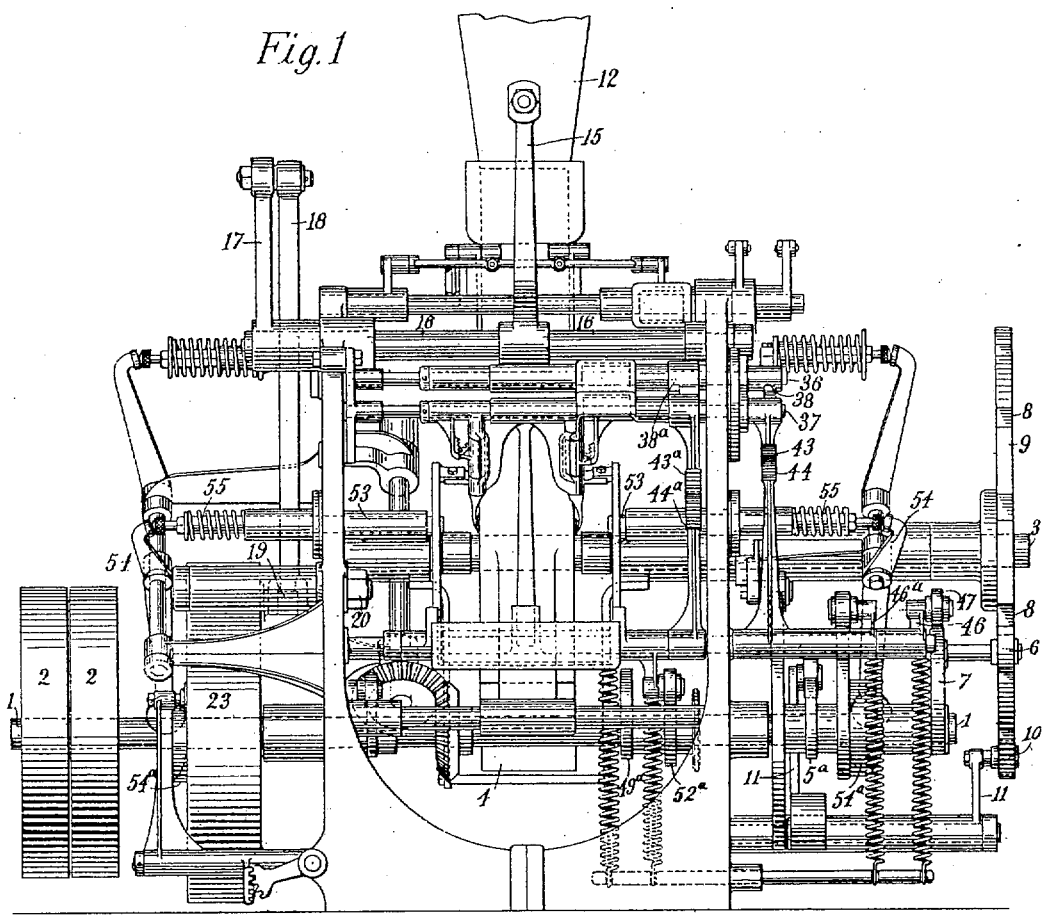

No. 762,255. PATENTED JUNE 7, 1904.
W. ROSE.
PACKING MACHINE.
APPLICATION FILED OCT. 12, 1901.
NO MODEL. 11 SHEETS—SHEET 1.

Witnesses:

William Rose, Inventor by Robt. H. Duncan Att'y

No. 762,255. PATENTED JUNE 7, 1904.
W. ROSE.
PACKING MACHINE.
APPLICATION FILED OCT. 12, 1901.
NO MODEL. 11 SHEETS—SHEET 2.

Witnesses:
Raphaël Setter
Jesse B. Kay

William Rose, Inventor
by Robt. H. Duncan Atty

No. 762,255. PATENTED JUNE 7, 1904.
W. ROSE.
PACKING MACHINE.
APPLICATION FILED OCT. 12, 1901.
NO MODEL. 11 SHEETS—SHEET 3.

Witnesses: William Rose, Inventor

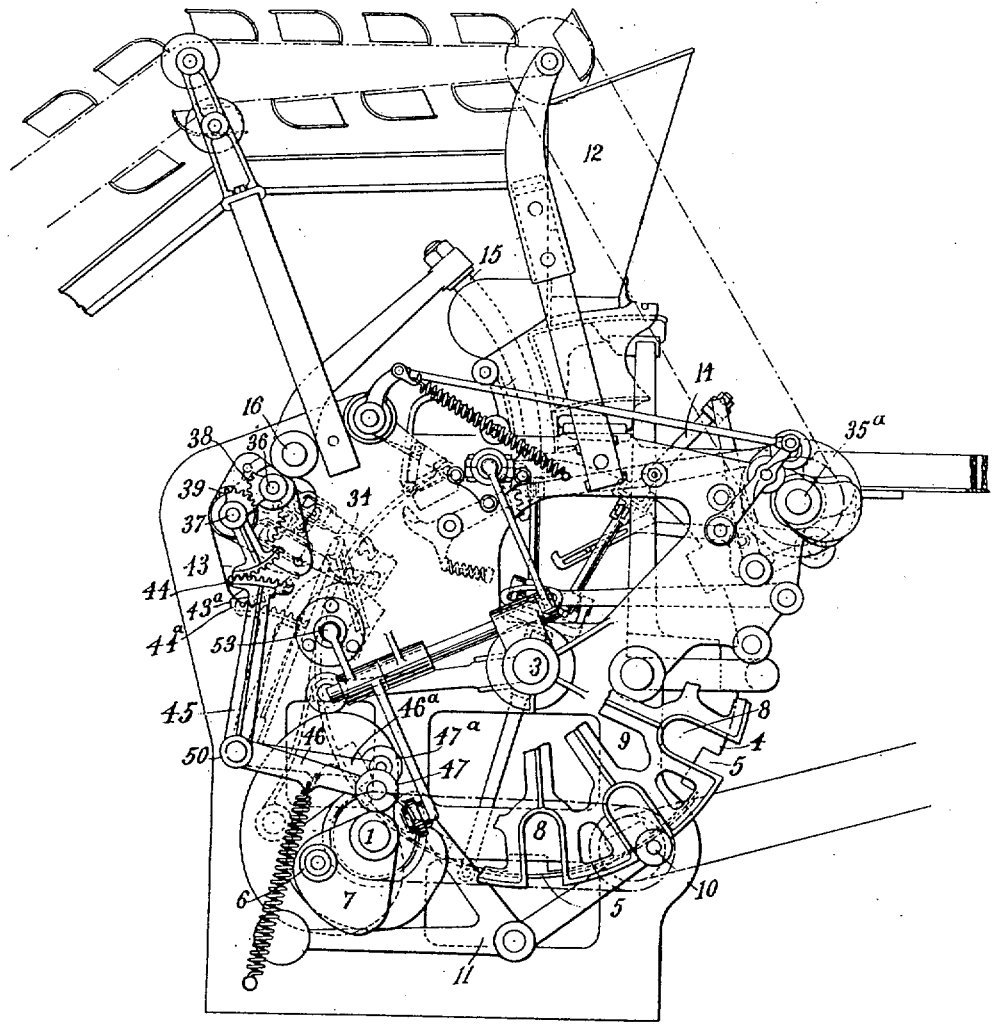

No. 762,255. PATENTED JUNE 7, 1904.
W. ROSE.
PACKING MACHINE.
APPLICATION FILED OCT. 12, 1901.
NO MODEL. 11 SHEETS—SHEET 5.
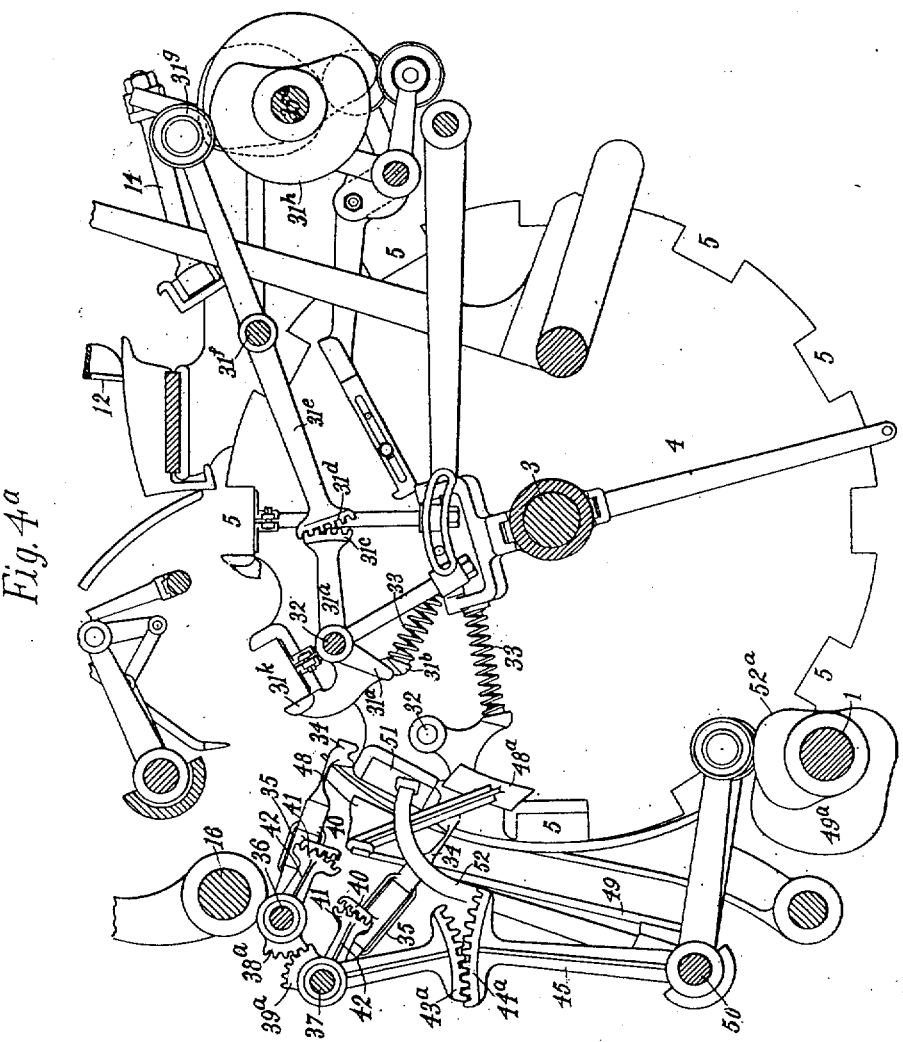
Witnesses:
Alexander Mitchell
Jessie B. Kay
William Rose, Inventor
by Robt. H. Duncan, Atty No. 762,255. PATENTED JUNE 7, 1904.
W. ROSE.
PACKING MACHINE.
APPLICATION FILED OCT. 12, 1901.
NO MODEL. 11 SHEETS—SHEET 6.
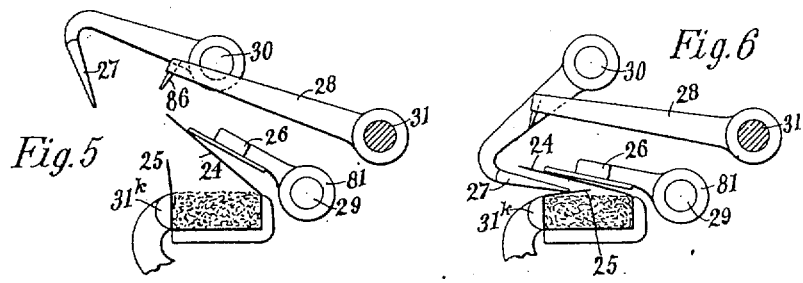
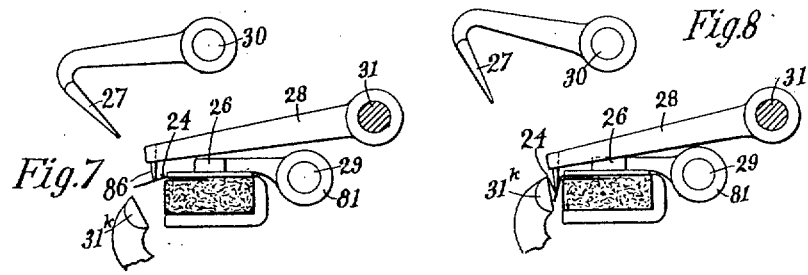
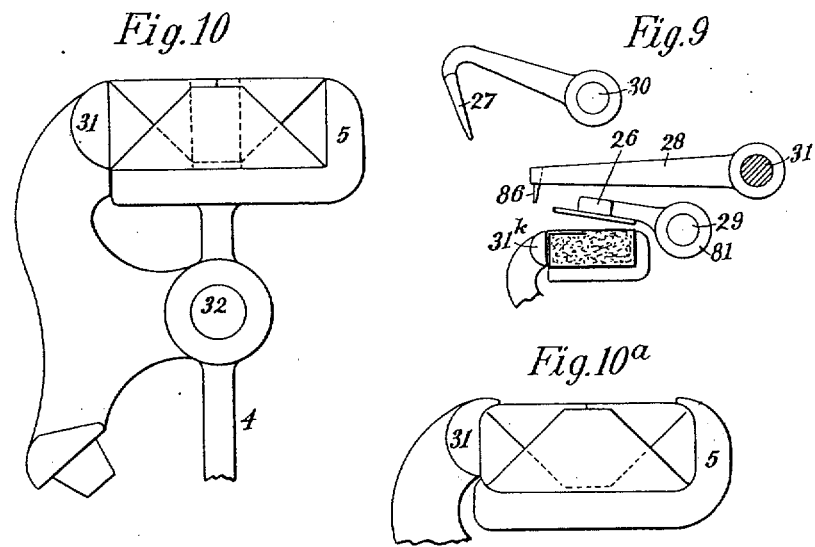
Witnesses:
Raphail Netter
Jessie B. Kay
William Rose, Inventor
by Robt. H. Duncan Att'y No. 762,255. PATENTED JUNE 7, 1904.
W. ROSE.
PACKING MACHINE.
APPLICATION FILED OCT. 12, 1901.
NO MODEL. 11 SHEETS—SHEET 7.
Fig. 10$^b$
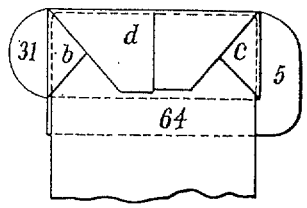
Fig. 10$^c$
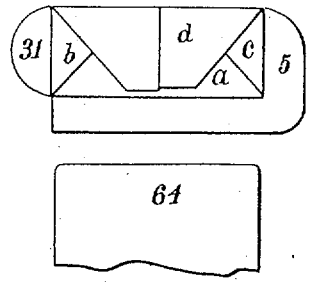
Fig. 23
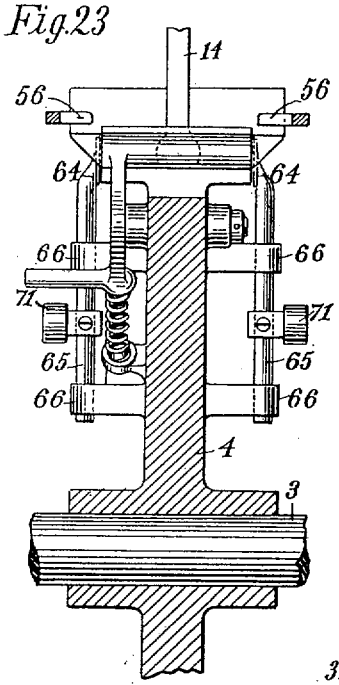
Fig. 24
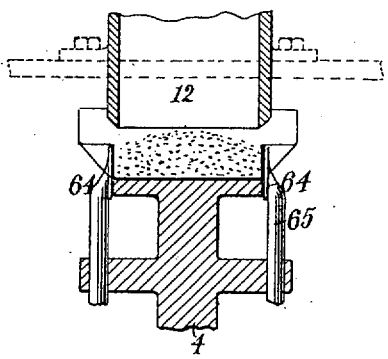
Fig. 25
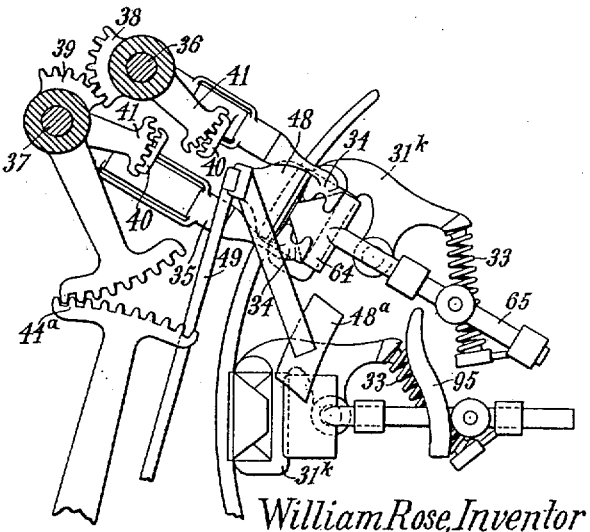
Witnesses:
Raphael Netter
Jessie B. Kay
William Rose, Inventor
by Robt. H. Duncan Atty
THE NORRIS PETERS CO., PHOTO-LITHO., WASHINGTON, D. C.

No. 762,255. PATENTED JUNE 7, 1904.
W. ROSE.
PACKING MACHINE.
APPLICATION FILED OCT. 12, 1901.
NO MODEL. 11 SHEETS—SHEET 8.
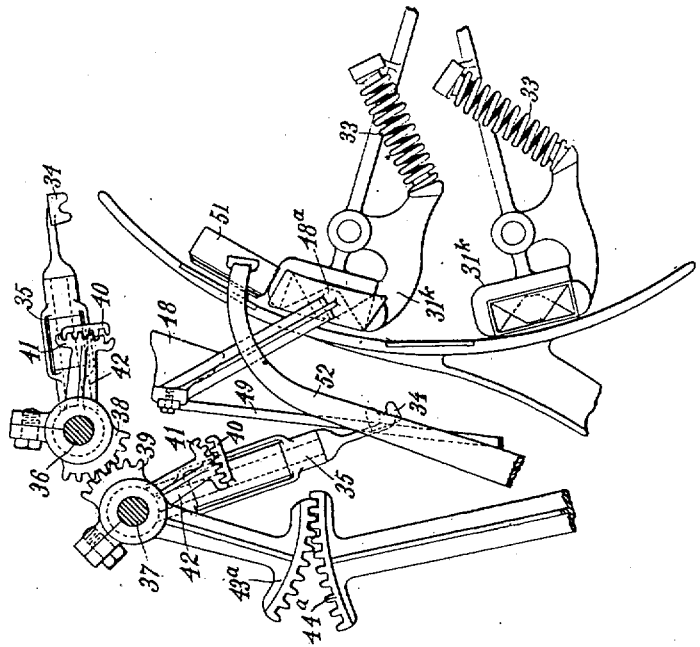
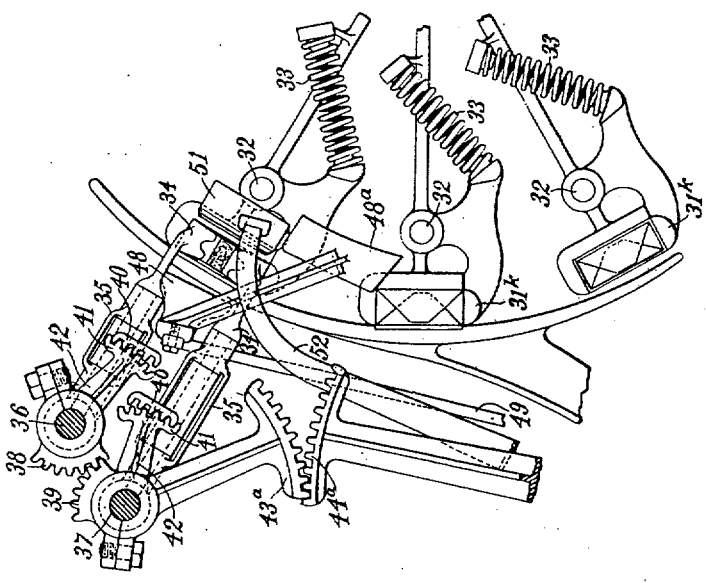
Witnesses: William Rose, Inventor No. 762,255. PATENTED JUNE 7, 1904.
W. ROSE.
PACKING MACHINE.
APPLICATION FILED OCT. 12, 1901.
NO MODEL. 11 SHEETS—SHEET 9.
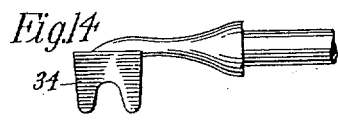
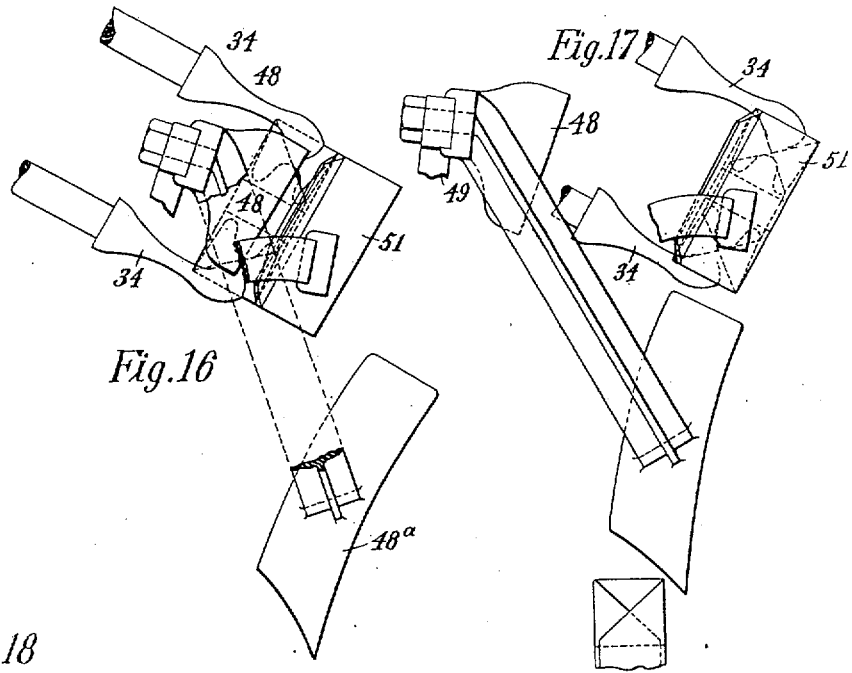
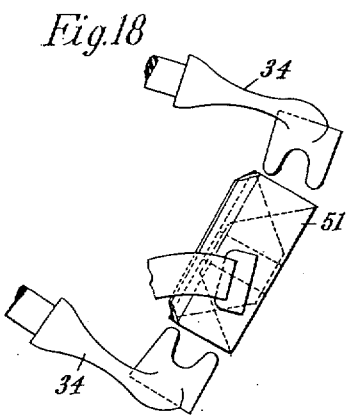
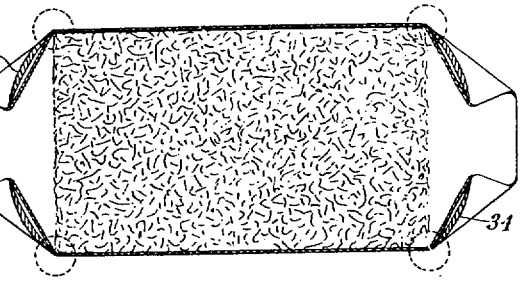
Witnesses:
Raphael Netter
Jessie B. Kay
William Rose, Inventor
by Robt. H. Duncan, Att'y No. 762,255. PATENTED JUNE 7, 1904.
W. ROSE.
PACKING MACHINE.
APPLICATION FILED OCT. 12, 1901.
NO MODEL. 11 SHEETS—SHEET 10.

Witnesses:

William Rose, Inventor by Robt. H. Duncan Att'y

No. 762,255. PATENTED JUNE 7, 1904.
W. ROSE.
PACKING MACHINE.
APPLICATION FILED OCT. 12, 1901.
NO MODEL. 11 SHEETS—SHEET 11.

William Rose, Inventor
by Robt. H. Duncan, Att'y

No. 762,255.

Patented June 7, 1904.

UNITED STATES PATENT OFFICE.

WILLIAM ROSE, OF GAINSBOROUGH, ENGLAND, ASSIGNOR TO WRIGHT'S AUTOMATIC TOBACCO PACKING MACHINE COMPANY, OF LYNCHBURG, VIRGINIA.

PACKING-MACHINE.

SPECIFICATION forming part of Letters Patent No. 762,255, dated June 7, 1904.

Application filed October 12, 1901. Serial No. 78,492. (No model.)

*To all whom it may concern:*

Be it known that I, WILLIAM ROSE, a subject of the King of Great Britain, and a resident of Gainsborough, in the county of Lincoln, England, have invented certain new and useful Improvements in Packing-Machines, of which the following is a specification, reference being had to the accompanying drawings.

This invention relates to machines for forming packages of substantially rectangular shape by folding a wrapper about the same, and relates to the type of packing-machine disclosed in my United States Patents No. 502,637, granted August 1, 1893, and No. 586,076, granted July 6, 1897. The machines of these patents were constructed and operated to form the packages in molds or pockets in the periphery of an intermittently-rotating wheel and the folds of the wrapper were formed in the following order or sequence: first, the longitudinal fold running lengthwise of the package; second, the top folds at each end of the package; third, the side or edge folds at each end of the package; and, fourth, the bottom folds at each end of the package. These machines were designed principally to pack fibrous material, and it has been found in practice that when this material is somewhat finely divided or contains a considerable proportion of what is known as "shorts" a portion of the material is liable to escape from the ends of the wrapper during the operation.

It is one of the main objects of the present invention to remedy the defect referred to in the existing machines by so constructing the devices for making the end folds of the package and arranging the order of their operation that the sequence of making such folds will be changed, the side or edge folds being made first and then the top and lastly the bottom folds; also, to employ a simpler and more reliable construction of devices for these purposes.

In order that my invention may be better understood, I will further describe the same with reference to the accompanying drawings, in which the same reference character refers to similar parts throughout the several figures.

Figure 2:
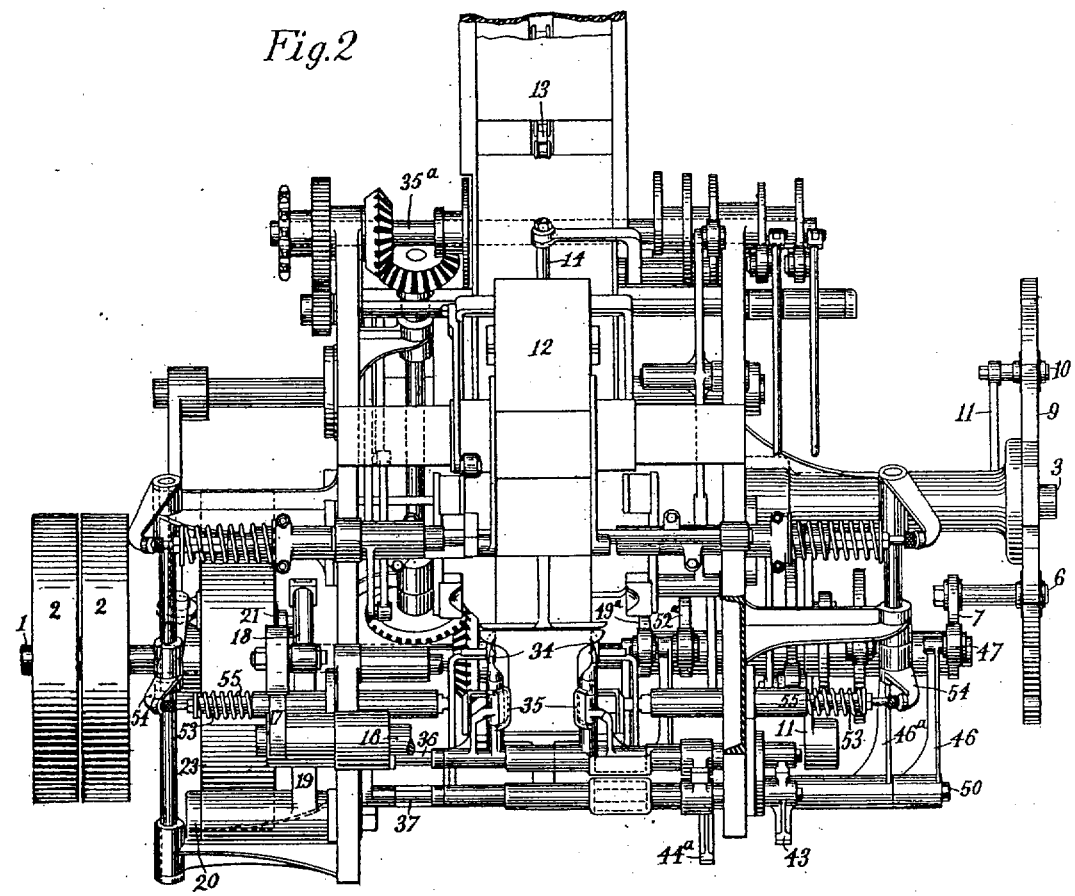
Figure 3:
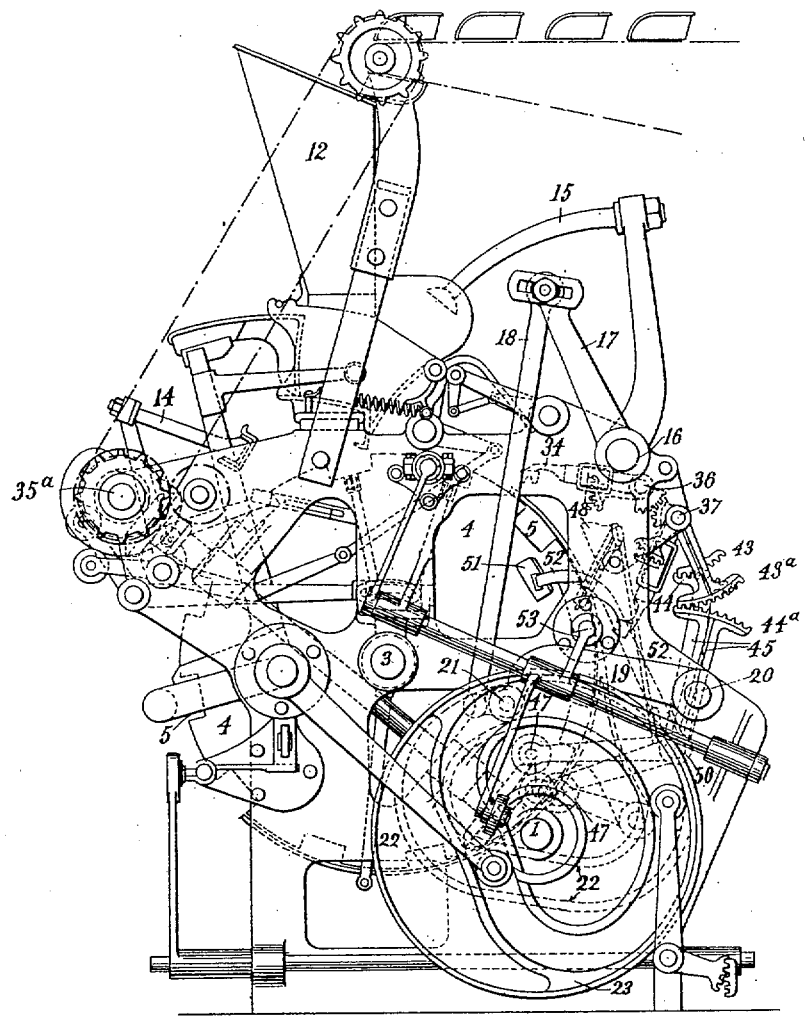
Figure 21:
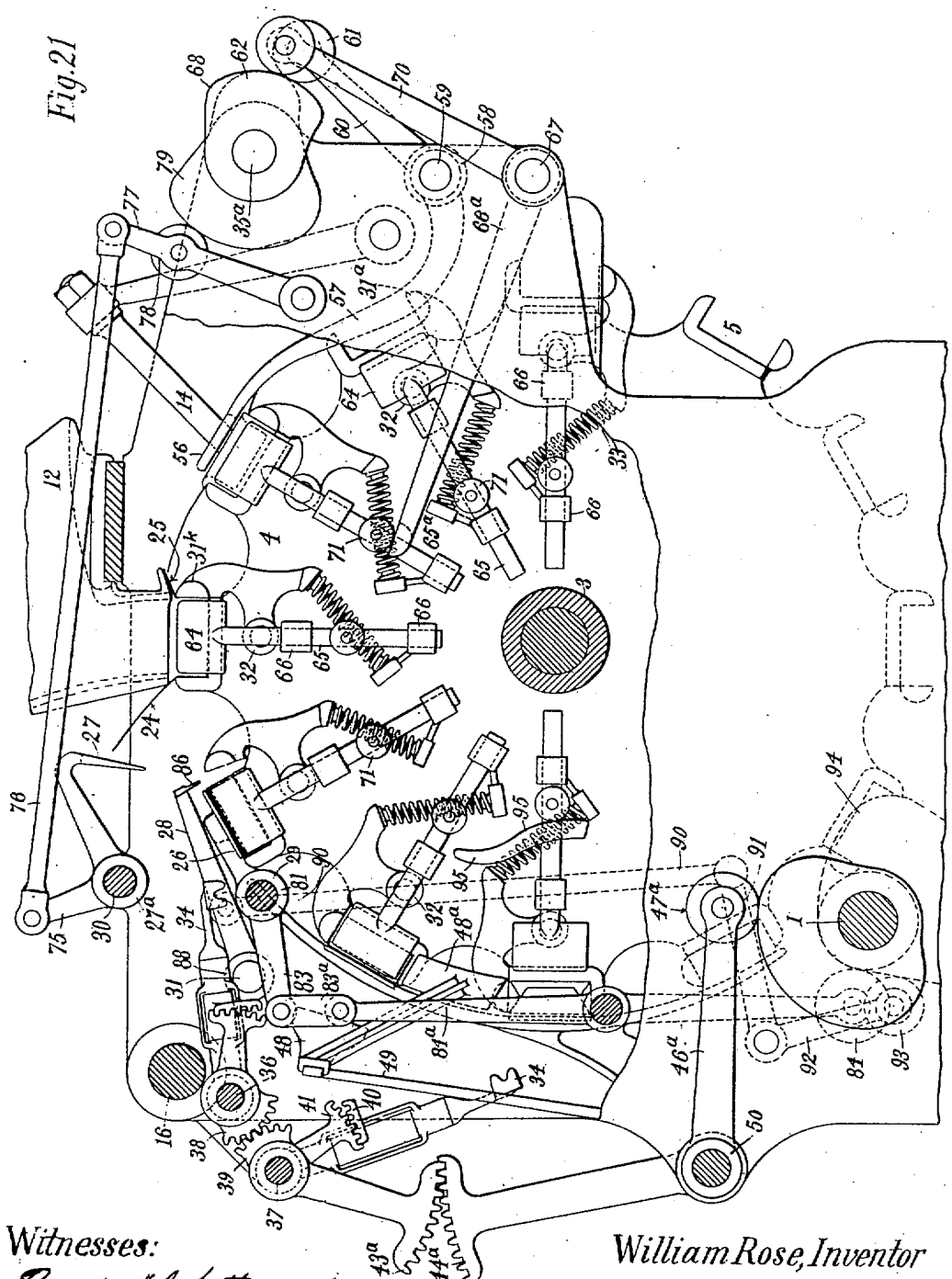
Figure 22:
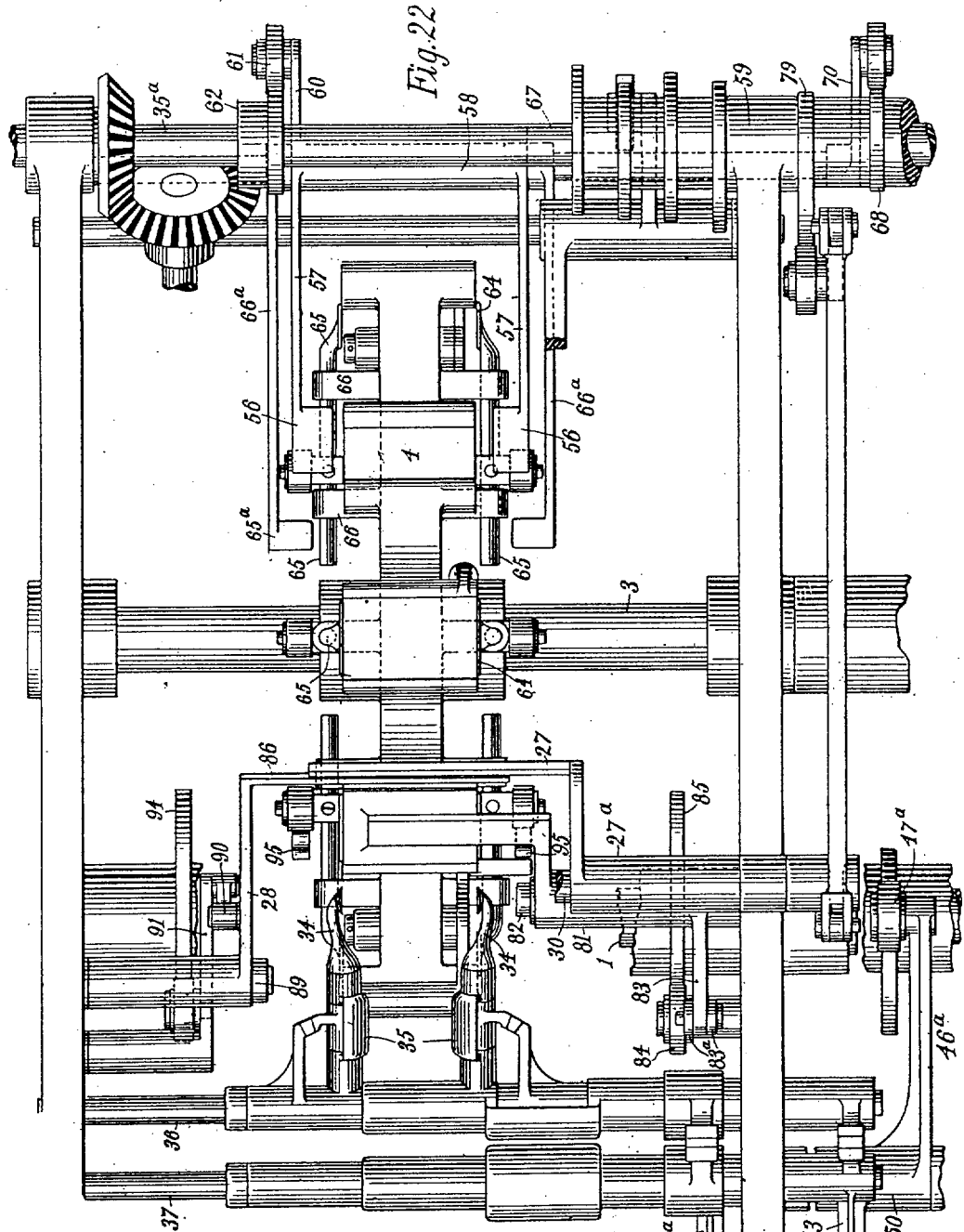

Figure 1 is a front elevation, and Fig. 2 a plan, of a machine of the type hereinbefore referred to. Fig. 3 is an elevation of the left-hand end of the machine; and Fig. 4, an elevation, and Fig. 4ª a transverse section, of the right-hand end thereof. Figs. 5, 6, 7, 8, and 9 show the successive steps in the folding of the packet. Fig. 10 represents the end of a complete rectangular packet in a mold wrapped according to one method. Fig. 10ª is a similar view showing a packet with rounded corners, the mold being shaped to suit this form of packet. Fig. 10ᵇ represents supporting-blades in position for retaining in position the bottom folds in the ends of the wrapper while the rest of the folds in the wrapper are being made. Fig. 10ᶜ shows the supporting-blades withdrawn after the end folds have been made. Figs. 11 and 12 show the mechanism for operating the devices for forming the end folds of the wrapper. Figs. 13, 14, and 15 are views of one folding-finger by which the two opposite side folds in the ends of the wrappers are made. Figs. 16, 17, and 18 show the successive steps in forming the said end folds. Figs. 19 and 20 are respectively a horizontal section and a longitudinal vertical section of a packet, showing the end folds in the wrapper being made. Fig. 21 is a section, and Fig. 22 a plan, of part of the machine, showing a modified construction for forming the end folds. Figs. 23 and 24 are views showing the folding devices for making the bottom folds on the ends of the wrapper, and Fig. 25 shows the operation of the side folders.

Referring to Figs. 1, 2, 3, and 4 of the drawings, 1 is the main shaft of the machine, having thereon fast and loose pulleys 2 to receive a driving-strap from any suitable motive-power engine. 3 is a shaft on which is keyed a disk or wheel 4, having in its periphery recesses or mold-boxes 5, in which the wrapping of the material is effected. This disk or wheel (which I will hereinafter refer to as the "mold-wheel") receives intermittent motion of partial rotation from the main shaft 1 by a roller 6, carried on a cam 7, fast on the shaft 1, the said roller entering at the required periods one of a series of notches 8 in the periphery of a disk or wheel 9, fast on the shaft 3, on which the mold-wheel 4 is keyed. The cam 7 is timed so as to cause the roller 6 to enter a notch 8, and by the rotation of the cam impart to the mold-wheel intermittent motion at the required periods. The mold-wheel is held stationary after such intermittent movement by a roller 10, carried on one arm of a two-armed lever 11, which is acted on by the cam 5$^a$ on shaft 1, so as to cause the said roller 10 to enter one of the notches 8 when the roller 6 has left the notch with which it had been engaged to rotate the mold-wheel. The material to be inclosed in wrappers is fed into the hopper 12, and the wrappers in which the material is to be inclosed are fed by an endless chain 13, (shown in Fig. 2,) one by one into position over the molds in the mold-wheel, so as to be pressed into the molds by a plunger 14, as is shown in the United States Patents referred to. When a wrapper is over a mold and the mold-wheel is stationary, the plunger 14 is caused to descend and force the wrapper into the mold, thereby causing the front and rear ends of the wrapper to stand up above the mold. The plunger 14 then rises and a partial rotation is given to the mold, as described, thereby bringing the mold with the wrapper therein into position beneath the hopper 12 to receive a charge of material to be inclosed in the wrapper. The material is forced from the hopper into the wrapper in the mold by a plunger 15, mounted on a rock-shaft 16, on which shaft is an arm 17, connected to the upper end of a rod 18, the lower end of which rod is connected to an arm 19, mounted on a stud 20. The arm 19 carries a roller 21, which engages in a cam-groove 22 in a disk 23, fast on the main shaft 1, the said cam being timed so as to cause the plunger 15 to descend to force the material into the wrapper and then to rise to allow the mold-wheel to make its next intermittent movement. This brings the mold containing the wrapper and material into position to have the upstanding ends 24 25, Fig. 5, of the wrapper folded over the top of the material by folding devices 26 27 28, carried, respectively, on studs 29 30 31 (see Figs. 5, 6, 7, 8, and 9) and operated by cams on a counter-shaft 35$^a$ and the main shaft 1. These cams are timed so that the end 24 of the wrapper is first partially folded down by the folding-plate 26 into the position shown in Fig. 5 and then the folder 27 is caused to descend, so as to fold the end 25 of the wrapper onto the material and beneath the end 24. The plate 26 at the same time descends into the position shown in Fig. 6, the folder 27 then receding, while the plate 26 farther descends, so as to fold the end 24 onto the end 25 of the wrapper, as shown in Fig. 7. A portion of the end 24 of the wrapper extends beyond the rear side of the mold, and this projecting end is then folded onto the rear side of the packet in the mold by the folding-blade 28, which is caused to descend between the rear side of the mold and the packet, as shown in Fig. 8. The rear side 31$^k$ of each mold is hinged at 32 to the mold-wheel, as shown in Figs. 4$^a$, 10, 11, and 12, and is normally held in its closed position by a spring 33, but it is caused to open at the required period to admit of the entrance of blade 86 of the folder 28 and then to close onto the packet after the folder 28 has again ascended. The opening of the side 31$^k$ is effected by one arm of a bell-crank 31$^a$ being caused to press on a projection 31$^b$ formed on the said movable side 31$^k$, the other arm of which bell-crank is provided with teeth 31$^c$ in gear with a rack 31$^d$ on one end of a lever 31$^e$, pivoted at 31$^f$ to the frame of the machine, the other end of the said lever carrying a roller 31$^g$ bearing on a cam 31$^h$ on the shaft 31$^a$. This cam is timed so that when the folding-finger 86 on the folder 28 is descending to fold the wrapper round the material the lever 31$^a$ is turned on its center, and through the gearing 31$^c$ 31$^d$ causes the side 31$^k$ to open out to admit the folding-blade and the wrapper. As the mold-wheel moves into the next position the projection 31$^b$ on the movable side leaves the arm of the bell-crank 31$^a$, and the side 31$^k$ is closed by the spring 33 against the folded wrapper. The material now being surrounded on four sides by the wrapper and the folders 26, 27, and 28 having risen, the mold-wheel 4 makes a farther partial rotation, bringing the mold containing the partially-inclosed material into position to have the laterally-projecting ends of the wrapper folded. An important feature of my present invention consists in the means employed for folding the said projecting ends of the wrapper and the order in which such folds are made. The two side folds $b$ and $c$ of each end of the wrapper, Figs. 10$^b$ and 10$^c$, are made by the folding-blades 34, mounted on frames 35, which in turn are mounted to rotate freely on shafts 36 and 37. There are two pairs of these folding-blades 34, which operate simultaneously on the two laterally-projecting ends of the wrapper, and the frames 35, carrying one pair of blades, are mounted on shaft 36 and those carrying the other pair are mounted on shaft 37, and the frames of both pairs are geared together by toothed segments 38$^a$ and 39$^a$, so as to cause the folding-blades of each pair to rotate simultaneously on the shafts 36 and 37 in opposite directions, and thereby to simultaneously approach and recede from the package at the required periods. The desired rotation of the frames 35 and the folding-blades 34 on their respective shafts is given by a segmental rack 43$^a$, connected to or formed in one with the frames 35 on shaft 37, in gear with a segmental rack 44$^a$ on one arm 45 of a bell-crank fast on rock-shaft 50, the other arm 46 of said bell-crank carrying a roller 47, acted on by the cam 7 on shaft 1. The folding-blades 34 are provided with cylindrical stems inserted in bearings in the frames 35, and fixed to each of these stems is a segmental-toothed rack 40, in gear with a similar rack 41 on arm 42, which is fast in either case to shaft 36 or 37. Since the arms 42 of the segments 41 are fast on the shafts 36 and 37, and these shafts are connected by gears 38 and 39 to rotate in unison, and since the segments 41 gear with the segments 40, fast in the stems of the folders 34, it follows that the folders will be rotated about their stems by the rotation of the shafts 36 and 37. The required rotation is given to the connected shafts by a segmental gear 43, secured to shaft 37, in mesh with gear 44, this latter gear being secured, as indicated in Fig. 1, upon a sleeve loosely mounted on the rock-shaft 50. The arm 46ª, also secured on this sleeve, carries a roller 47ª to engage a cam on shaft 1. By the mechanism just described the folders 34 have a two-fold movement. They are moved toward and away from the package by the rotation of the frames 35 about the shafts 36 and 37 by the means specified, and also as the folders approach the package from their extreme outward position they have a partial rotation about their stems, produced, by the partial rotation of the shafts 36 and 37, to which the folders are connected as described, so that when they come into contact with the outstanding ends on either side of the wrapper they are substantially parallel to the surfaces of wrapper to be folded at these points. Then the folders are rotated in opposite directions about their stems into the position indicated in Figs. 11 and 17 to fold the wrapper over upon the ends of the package, which latter position is maintained during their outward movement, as shown in Fig. 18, and until the folders again begin to move toward the package. The rotation of the folders about the shafts 36 and 37 continues till they come into contact with the wrapper, and then each folder rotates about its stem to lay a part of the wrapper over against the end of the package, in which position the folders preferably remain, as shown in Fig. 11, till the top fold is made, and the folders are then returned to their outward or diverged position by the rotation of their frames 35 in an opposite direction about the shafts 36 and 37. The top folds, as $d$, Fig. 10ᵇ, are made by blades or plates 48 on arms 49, mounted on the shaft 50, carrying the bell-cranks which operate the side-folders, the said arms 49 being operated by cams 49ª on the main shaft 1 at the proper period to fold the top of the projecting end of the wrapper onto the side-folding blades 34, the said blades 34 then withdrawing and separating from each other. The blades 51, by the upward movement of which the bottom folds $a$ of the projecting ends of the wrapper are folded, are carried on arms 52 of bell-cranks, which are also mounted on the shaft 50 and receive their up and down motions by cams 52ª on the main shaft 1, the cams 49ª being timed so as to cause the blades 48 to withdraw at the same time that the blades 51 are ascending. The arms which carry the blades 48 each carries another blade or plate, 48ª, which when the blades 48 ascend come into position to retain the folded ends of the wrapper in position as the mold-wheel makes the next intermittent movement to bring another mold with a partially-formed packet into position to have the ends of the wrapper folded. The mold-wheel at its next intermittent movement brings the wrapped packet into position to have the ends indented, as shown in the patents referred to, by pressers 53, carried on sliding plungers operated on by levers 54, which are moved by cams 54ª on the shaft 1, to indent the ends of the packets, the said plungers being returned to their outward position by springs 55. The packets may be discharged from the molds by any suitable mechanism.

According to the modified construction shown in Figs. 21 to 24, after the wrapper is forced into a mold by the plunger 14, as hereinbefore described, the bottom fold $a$ on the ends of the wrapper are first made (see Figs. 10ᵇ and 10ᶜ) so as to form a box-like receptacle for the reception of the material. The said bottom folds are made by plates 56 on arms 57, Figs. 21 and 22, projecting from a sleeve 58, mounted on a shaft 59, on which sleeve is an arm 60, carrying a roller 61, on which a cam 62 on the shaft 35ª acts at the required periods to impart oscillatory movements to the arms 57. When the arms 57 are in their normal position, the plates 56 are below the mold into which the wrapper has been forced by the plunger 14. The end of the plunger 14 in this case should be the same size as the packet to be formed. While this plunger is within the mold the arms 57 are caused by the cam 62 to rise, and in their ascent the plates 56 come into contact with the bottom of the projecting ends of the wrapper and fold the said bottom parts $a$ against the ends of the plunger 14. As the folding-plates 56 arise above the mold the other blades 64 are caused to rise into position against the said bottom folds, as shown in Figs. 10ᵇ and 21, to hold them in position while the mold-wheel is moving into the positions to have the rest of the folds made and while the said folds are being made. For each mold in the mold-wheel there is provided a pair of plates 64, each plate having a shank 65 fitted to slide in guides 66 with sufficient friction to retain the plates 64 in the position to which they are raised. The raising of the plates 64 is effected by projections 65ª on arms 66ª, mounted on a shaft 67, to which shaft rocking motion is imparted by a cam 68 on the shaft 35ª, acting on an arm 70, fast on the said shaft 67. This causes the projections 65ª to come into contact with rollers 71 on the stems 65 of the plates 64 and raise each pair of plates as they are brought in succession into position by the intermittent motions of the mold-wheel. The said bottom folds a being thus formed and supported by the plates 64, the plunger 14 rises out of the mold and the mold-wheel moves into the next position, and while in this position the material is fed from the hopper 12 into the box-shaped wrapper in the mold. The material having been fed into the wrapper, the mold-wheel moves into the next position, and in moving into this position the forward upstanding end 24 of the wrapper comes against the folding-blade 27, (see Fig. 21,) whereby the said end is partially folded down over the material. The said blade 27 is carried on a sleeve $27^a$, mounted on a shaft or stud 30, on which sleeve is an arm 75, connected by a rod 76 to another arm, 77, pivoted to the frame of the machine. This arm 77 carries a roller 78, which is acted on by a cam 79 on the shaft $35^a$, the said cam being suitably timed to cause the blade 27 to descend and engage the rear upstanding end 25 of the wrapper and fold the said end upon the material beneath the end 24. The end 24 is then folded down by the plate 26, carried by a sleeve 81, mounted on a stud 29 and having an arm 83 connected by a link $83^a$ to a lever $84^a$. This lever carries a roller 84, against which a cam 85 on shaft 1 acts so as to cause the plate 26 to descend at the proper time and lay the end 24 upon the end 25. A portion of the end 24 when folded down projects beyond the rear end of the mold, and this projecting portion is folded down against the side of the packet by a blade 86 on an arm 28, carried by a sleeve 88, mounted on a stud 31. The arm 28 is connected by a rod 90 to one arm, 91, of a bell-crank, the other arm, 92, of the said bell-crank carrying a roller 93, on which a cam 94 on the main shaft 1 acts, so as to give to the blade 86 the necessary up and down motions at the required periods. The longitudinal folds and also the bottom folds a of the ends of the wrapper having been made, the mold-wheel moves into the next position in which the two side folds b and c and the top folds d on each end of the packet are made in the following manner: The folding plates or blades 34, actuated as has been described, advance toward the partially-formed packet and come into contact with the wrapper to form the side folds b and c and lay them over the plates 64. The plates 34 now commence to withdraw from the end of the packet, and simultaneously with this movement the plates 48 descend to form the top fold d and lay it upon the already-formed side folds b and c. All the folds now having been made they are retained in position and indented in a well-known manner. It will be noted that after the side folds have been completed and the mold-wheel moved into the next position the plates 64, which up to this time had supported the bottom folds a, are withdrawn by the rollers 71, on which the arms 66 acted to raise the plates 64, coming into contact with a stationary cam-surface 95, and these plates are thus returned to their normal position, as shown in Figs. $10^a$ and 21. The mold-wheel then makes a further partial rotation, bringing the completed packet into position to be ejected from the mold-wheel in the manner well known in this type of machine. As the mold-wheel rotates the rollers 71 on the stems 65 of the supporting-plates 64 pass in succession past the arms $66^a$ into position to be acted on by the projections $65^a$ on the said arms to raise the said plates 64.

Numerous modifications may be made in the construction of various parts of this machine, and I do not, therefore, wish to be limited to the exact disclosure which I have made in this case.

What I claim as new, and what I wish to secure by Letters Patent, is set forth in the appended claims:

1. In a packing-machine, a mold-wheel, means to intermittently rotate said mold-wheel, molds mounted on the periphery of said mold-wheel, a movable side for each of said molds, means to feed a wrapper into each of said molds, means to feed material to be wrapped into said wrapper, means to form the longitudinal fold in said wrapper, means to form the top and bottom fold in said wrapper and a pair of side-folders mounted to revolve about their stems, supporting-frames in which said stems are mounted, revolubly mounted on folder-shafts and geared together to rotate in unison, means to rotate said frames to bring the folders into engagement with the side folds of the wrapper, means to rotate said folders about their stems to press the side folds against the package and means to withdraw said folders edgewise from contact with the wrapper.

2. In a packing-machine, a rotary mold-wheel, means to force wrappers and material to be wrapped into said mold-wheel, means to form the folds in said wrapper comprising two folder-shafts, frames mounted upon said shafts and folders mounted in said frames and means to rotate said folders in said frames to lie at an angle to each other, to move said frames toward each other to bring the folders into engagement with the wrapper, to rotate said folders in said frames to form the folds in said wrapper and to withdraw said folders edgewise from said wrapper.

3. In a packing-machine, two folder-shafts, a folder-frame revolubly mounted on each of said shafts, folders in said frames, means to bring said folders into engagement with a wrapper by rotating them about said shafts and means to rotate said folders in said frames to form the folds of said wrapper.

4. In a packing-machine, two folder-shafts geared together to rotate in unison, frames revolubly mounted upon each of said shafts, said frames being geared together to rotate in unison, folders revolubly mounted in said frames and means to rotate said folders in said frames from said shafts.

5. In a packing-machine, a folder-shaft, a folder-frame revolubly mounted on said shaft, a folder revolubly mounted in said frame, means to rotate said frame about said shaft and means connected with said shaft to rotate said folder in said frame.

6. In a packing-machine, a revoluble folder-frame and an oscillating folder revolubly mounted in said frame to move into contact with a wrapper and to rotate about its axis to fold said wrapper.

7. In a packing-machine, means to form a longitudidal fold in a wrapper, means to form the end folds in said wrapper comprising oscillating rotary folders, means to move said folders into engagement with said wrapper, means to rotate said folders into substantially the same plane to form folds in said wrapper, means to form another fold upon said folders and means to withdraw said folders edgewise from said wrapper.

8. In a packing-machine, means to fold a wrapper including an oscillating rotary folder to form an end fold in said wrapper, means to oscillate said folder into contact with said wrapper, means to rotate said folder to form the fold in said wrapper, means to form a fold over said folder and means to withdraw said folder edgewise from said wrapper.

WM. ROSE.

Witnesses:
  THOS. C. BOURNE,
  WALTER WARD.